Figure 1:
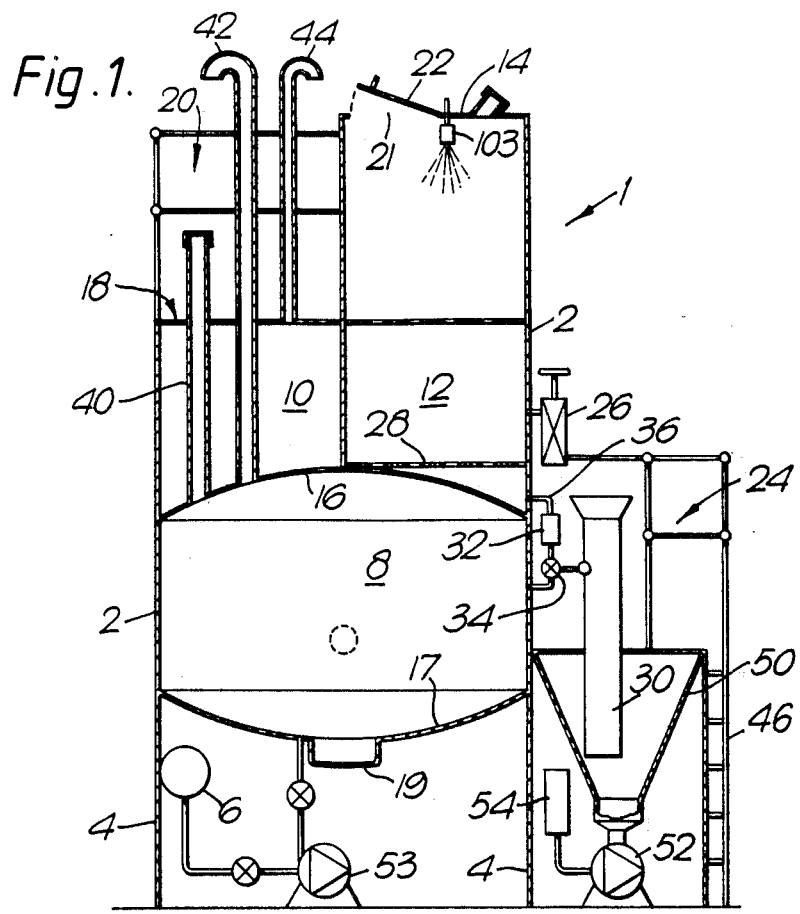

United States Patent [19]

Wilkinson

[11] Patent Number: 4,653,388

[45] Date of Patent: Mar. 31, 1987

[54] BREWING

[75] Inventor: Noel R. Wilkinson, Burton-on-Trent, England

[73] Assignee: Robert Morton DG Limited, England

[21] Appl. No.: 404,856

[22] Filed: Aug. 3, 1982

[30] Foreign Application Priority Data

Apr. 7, 1982 [GB] United Kingdom ................ 8210347

[51] Int. Cl.⁴ ............................................ C12F 1/02
[52] U.S. Cl. .................................... 99/277.2; 426/16
[58] Field of Search ............. 99/275, 276, 277, 277.1, 99/277.2, 278; 435/302, 316; 426/11, 29, 16, 426/600

[56] References Cited

U.S. PATENT DOCUMENTS

| 82,208 | 9/1868 | Conday | 435/302 |
|---|---|---|---|
| 861,979 | 7/1907 | Heuser | 435/302 |
| 1,487,842 | 3/1924 | Dolenz | 99/276 x |
| 3,249,443 | 5/1966 | Reiter | 99/278 X |
| 3,392,034 | 7/1968 | Barnes | 99/276 X |
| 3,962,478 | 6/1976 | Hohlbein et al. | 99/278 X |
| 4,002,111 | 1/1977 | Pujol | 99/276 |
| 4,009,286 | 2/1977 | Moll et al. | 99/276 X |
| 4,108,052 | 8/1978 | Cunningham | 99/275 |
| 4,347,321 | 8/1982 | Lionelle et al. | 435/302 |
| 4,494,451 | 1/1985 | Hickey | 99/276 |

FOREIGN PATENT DOCUMENTS

| 2949918 | 7/1981 | Fed. Rep. of Germany | 426/16 |
|---|---|---|---|
| 976838 | 12/1964 | United Kingdom | 435/302 |
| 2109809 | 6/1983 | United Kingdom | 99/278 |
| 2118206 | 10/1983 | United Kingdom | 99/276 |

Primary Examiner—Harvey C. Hornsby
Assistant Examiner—Frankie L. Stinson
Attorney, Agent, or Firm—Wood, Herron & Evans

[57] ABSTRACT

An improved brewing unit in which energy is saved by providing a mash tun, hot water tank and kettle in a single unit, by partially enclosing the mash tun with the tank and if necessary pre-heating the water supply to the tank by using the heat from wort coolers provided between the unit and fermentation tank; further improvements are provided by constructing the kettle as a combined kettle and whirlpool in a single chamber having a circular wall and a tangential inlet to the wall, a pump and wort boiler being in circuit with the kettle so that wort is continuously circulated through the boiler and tangential inlet to the kettle while the worts are boiled. The combined kettle and whirlpool saves space and enables the process of brewing to be shortened with resultant savings in both energy and brewing time.

11 Claims, 3 Drawing Figures

BREWING

The present invention relates to a brewing unit.

In the past production of beer has tended to be concentrated in large volume production plant, where large scale production had significant economic advantages. However, recent distribution costs and the requirement for specialised brews have indicated a requirement for more adaptable small scale plant suitable for the on site consumption of beer and suitable for the small scale brewing of special beers. Small scale production plant has been proposed in the past.

A brewing unit according to the present invention comprises a hot water tank, a mash tun at least partially surrounded by the hot water tank and in controlled liquid communication therewith, a kettle mounted below the tank and tun and in controlled liquid communication with said tun, the kettle having circular enclosed walls, a boiler mounted closely adjacent the kettle and provided with a boiler discharge in controlled liquid communication with the kettle. The discharge is preferably tangentially mounted to the kettle circular walls, and a boiler input is in controlled liquid communication with the kettle, so as to form a continuous circuit between the kettle and boiler, a pump being positioned in the circuit enabling liquid to be continuously circulated between the kettle and boiler, a cooling unit may be in liquid communication with a discharge from the kettle, and at least one container may be in liquid communication with the cooling unit for holding cooled liquid discharge from the kettle during a fermentation period.

According to another aspect of the invention there is provided a brewing unit having a combined kettle and whirlpool in a single chamber having a circular wall, an external wort boiler, a discharge from which enters the chamber tangentially and means for continuously circulating wort through the boiler and chamber via the boiler discharge and a boiler inlet in communication between the boiler and chamber.

The combined kettle/whirlpool saves space and enables the process to be shortened with resultant savings in brewing time and energy.

The at least partial surrounding of the mash tun by the hot water tank enables the mash in the tun to be economically and effectively warmed. Preheating of the tun is also achieved by the relative hot water tank and kettle locations and the kettle proximity and location also enables preheating of the hot water tank.

Preferably the kettle, tun and hot water tank are enclosed in a single tower which improves heat transference and enables these three components with the possibility of the further incorporation in the tower of the boiler so that the tower can be readily transported in one unit by road or rail transport to the brewing site.

In the preferred embodiment the mash tun has a substantially sectoral cross section with the straight radial sides forming, as its bottom, sides for the hot water tank. This arrangement aids heat transference and saves space enabling a compact easily transportable unit to be constructed.

Figure 2:
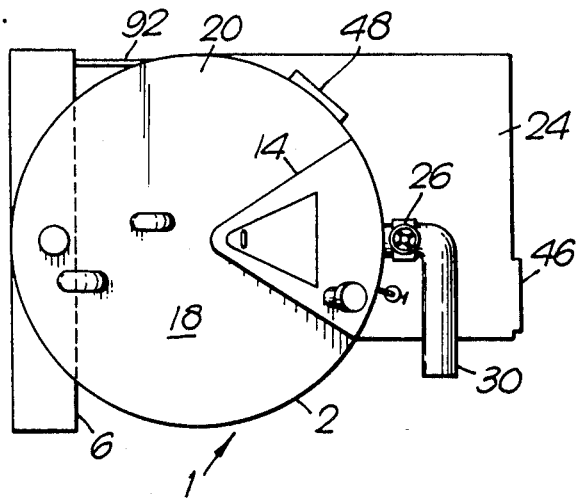
Figure 3:
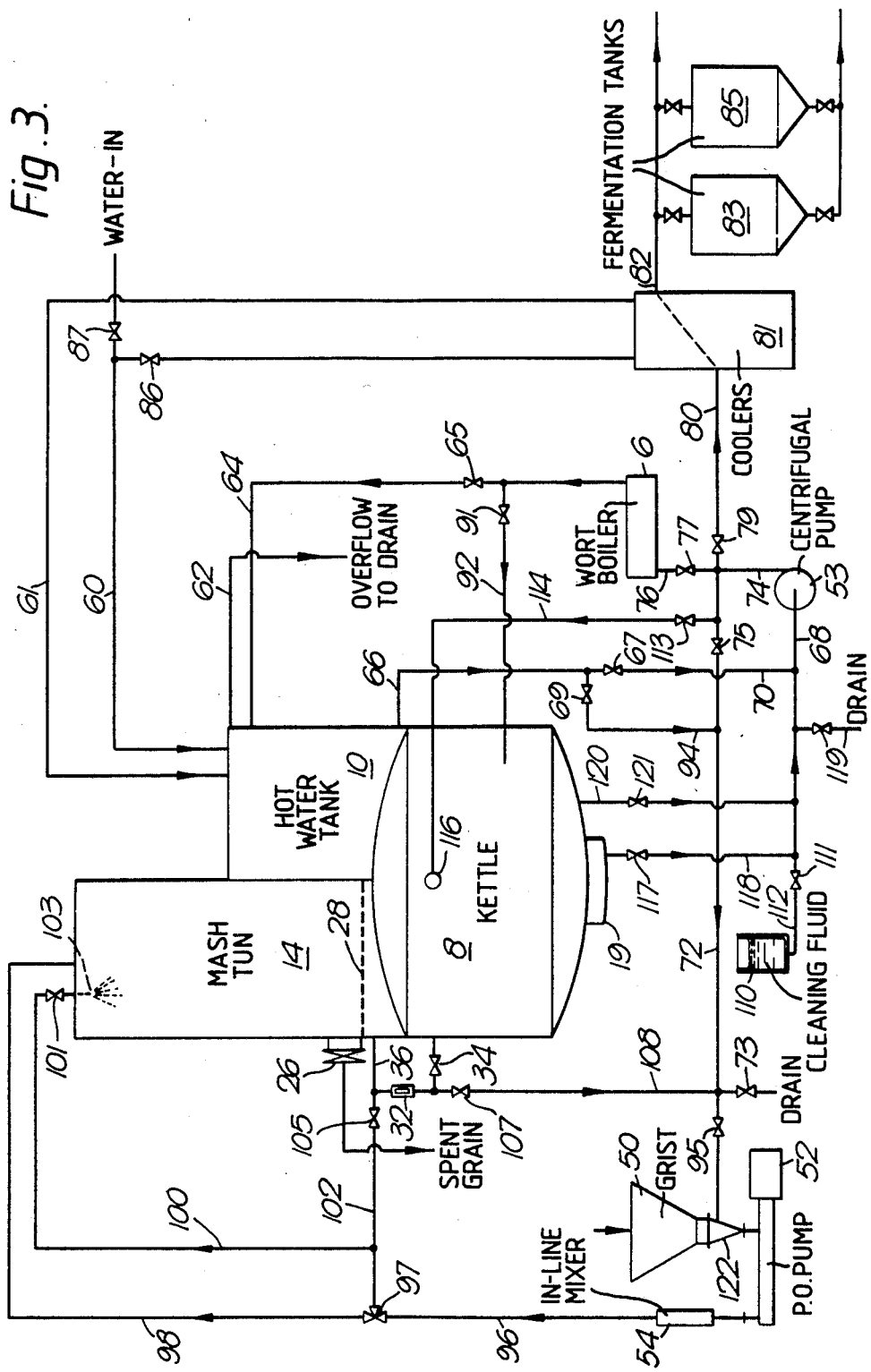

An embodiment of the invention will now be described by way of example with reference to the accompanying drawings in which:

FIG. 1 is a diagrammatic elevation of a wort production tower for a brewing unit according to the invention, FIG. 2 is a plan view of the production tower of FIG. 1, and FIG. 3 is a piping diagram of the tower of FIG. 1 and associated equipment, and including the connections between the tower of FIG. 1 and the remainder of the unit.

In FIGS. 1 and 2 there is shown a wort production tower generally at 1 comprising a cylindrical tower wall 2 having a lower stand portion 4 in which is located a direct fired external wort boiler 6 and above which within the cylindrical wall 2 is a kettle 8 or "whirl pool chamber". Above the kettle 8 and still within the wall 2 is a hot water tank 10 which surmounts the whole kettle except for a segmental portion 12 which forms the bottom portion of a mash tun 14.

The curved top 16 of the kettle forms the bottom of both the tank 10 and tun 14. The curved bottom 17 of the kettle has a trub sump 19. The top of the tank 10 or plating 18 immediately above it forms the floor of an upper access stage 20 for viewing the tun 14 through an opening 21 covered by hinged lid 22 in the top of the tun.

A lower access stage 24 may be provided to one side of the tower so as to reach a spent grain removal valve 26 for extracting spent grain collected on a perforated false bottom plate 28 mounted above the curved bottom 16 of the tun 14. A chute 30 is fitted under the outer side of the valve 26 so that spent grain can be shot down to a tub or barrow on the ground level. The stage 24 also gives access to a wort run off viewing glass 32 and control valve 34 connected by piping 36 between the bottom of the tun 14 and the kettle 8. A grist hopper 50 connecting via a positive displacement pump 52 is suitably provided under stage 24. Pump 52 pumps the grist through a mixer 54 and suitable piping to the tun.

A covered adjunct insert pipe 40 enables adjuncts such as sugar, hops or whirlpool finings to be added to the kettle. The kettle has a vent pipe 42 and a similar vent pipe 44 is provided for the tank 10.

Ladders 46 and 48 are provided to enable the operator to reach lower and upper stages 24 and 20 respectively.

FIG. 3 shows the piping and valve connection between the kettle, tun and hot water tank.

A main water inlet supply line 60 connected to a source of fresh water (not shown) enters the tank 10 which is provided with an overflow line 62, a recycling inlet line 64 controlled by valve 65, and an outlet line 66. The outlet line 66 can be connected by opening valve 67 and closing valve 69 to the inlet line 68 of centrifugal circulating pump 53 via line 70 or to a common facilities line 72 (having drain valve 73) by closing valve 67 and opening valve 69.

The centrifugal pump 53 of 35–40 gallons (135–180 liters) per minute capacity has an outlet line 74 which can be connected by operation of valves 75, 77 and 79 either to common line 72, wort boiler inlet or kettle discharge line 80. As shown in FIG. 3, kettle discharge line 80 is connected to a cooling unit 81, suitably a known plate heat exchanger made by the Alfa-Laval Company and thence by a line 82 to two or more fermentation maturation tanks 83, 85 of a known cylindro-conical type each having half or all the capacity of the calibration length of 360 gallons (UK) (1,640 liters). The numbers of tanks 83, 85 depends on customer requirements that is that type of beer being made and the usage level of the unit, Lager production requiring a longer maturation may require additional maturation tanks whilst ale production would require less maturation capacity due to the quicker maturation time.

The heat exchanger or cooling unit 81 can be used to warm water fed into the tank 10 through a water inlet 61 if required so as to save heat energy by operating valves 86 and 87.

Returning to FIG. 3, wort boiler 6 which is a gas fired liquid tube boiler has an outlet line 90, both inlet 76 and outlet 90 being preferably tangential to the boiler to obtain a certain amount of swirl at the entry and exit. The gas supply is suitably about 440 cu.ft/hour (12.5 m$^3$/h) of natural gas or 880 cu.ft/hour (25.0 m$^3$/h) town gas. The outlet 90 can feed back into the tank 19 by opening valve 65 or into kettle inlet line 92 by opening valve 91. Inlet line 92 feeds tangentially into kettle 8.

In order to fill the mash tun 14 with mash (grist and water), water can be drained down from tank 10 by opening valve 69 to line 94 thence to line 72 and by opening valve 95 to the bottom of grist hopper 50 connected to positive displacement pump 52 which then pumps the water up through mixer 54 feed line 96 through the three way valve 97 and feed line 98 to the top of tun 14. Grist is pumped simultaneously the same way from hopper 50. For sparging, valve 97 can be operated to open sparge line 100 to sparge valve 101 and sparge head 103. Valve 97 can also be operated to open line 102 to feed valve 105 then line 36 into tun 14 for underletting.

Communication between tun 14 and kettle 8 is by line 36 viewing glass 32 and valve 34. Line 36 can also be used for recirculation of wort in the mash tun 14 by closing valves 36 and 105, opening valves 107 and 95 and pumping the draining wort by means of pump 52 back to the top of the tun through lines 96 and 98.

Cylindrical tower wall 2 and other outer portions of the tower can be suitably lagged to retain heat within the tower 1.

The tower unit can be cleaned throughout by filling cleaning fluid tank 110 at the bottom of which is cleaning outlet 112 and cleaning valve 111 opening to pump inlet line 68 and then using the pump 53 to circulate cleaning fluid to kettle through valve 113 to kettle cleaning line 114 and spray head 116. The kettle is drained finally through trub sump valve drain line 118 and drain valve 119. A further drain valve 73 can be used to drain lines 72 and 108.

Alternatively it is possible to dispense with the cleaning fluid tank 110 and feed the cleaning fluid directly into the grist hopper using pump 52 to circulate the cleaning fluid through components of the tower unit comprising kettle, tank, tun and boiler.

The cleaning facility can also be used to clean the fermentation tanks by pumping through line 80.

Whilst brewing, the brew is drained from the kettle to the fermentation/maturation tanks by discharge outlet 120, discharge valve 121 and pump 53 through line 80.

To operate the unit which is designed in one example to process a calibration length of 360 gallons (UK) (1,640 liters) or 14 US barrels of wort in the fermentation/maturation tanks, the hot water in tank 10, which is of sufficient volume to contain the total water charge for the calibration length, is heated to the mashing strike temperature (typically 70° C.) by cycling the water through the direct fired external boiler 6.

The mash tun 14 is partially filled with the hot foundation water to a level of 25 to 30 mm above the plate 28 by means of pump 52. The water in the mash tun is maintained at the strike temperature by heat transmission through the walls of the tun enclosed by the tank 10.

A calibrated weight of pre-milled material (grist, comprising typically malted barley possibly with cereal adjuncts) is then manually fed normally through hopper 50. The grist etc. is mixed with a suitable addition of hot water from line 72 in a vortex mixer chamber 122 between hopper 50 and pump 52 and an in-line static mixing element 54 of the Kenics (trade name) type. The vortex mixer chamber 122 is shown very diagrammatically in FIG. 3 since it simply comprises a central 2 inch (50 mm) feed pipe from the hopper entering the conical vortex chamber and a tangential water inlet connected to valve 95 so that swirling incoming water collects the falling grist for feeding into the pump 52.

After the mash tun has been filled with the mash of water and grist etc. the mash is allowed to remain for a suitable time normally 2 hours at a typical temperature of 64° C. to allow efficient enzyme conversion of sugars, starches etc. During the conversion stand the remaining volume in the hot water tank is raised to the required sparging temperature (normally 74° C.).

The strong (First) worts are now run off by gravity from the bottom of the tun below the plate 28 through the clear illuminated sight glass 32 and regulating valve 34 into the kettle 8.

When the majority of the strong worts are collected, the remaining charge in the tank 10 is sparged into the tun 14 to give efficient elution of the remaining extract in the tun.

Before the kettle is filled from the tun, the worts are preheated by pumping through the boiler 6. The optimum time cycle allows the wort volume to be preheated to 100° C. as the calibration length from the tun is achieved.

The remaining mash in the tun, now termed spent grains, is allowed to drain down into the kettle to a typical 80% moisture content.

The kettle charge of sweet worts is boiled at a typical temperature of 100°–120° C. for a suitable period normally one hour. During this phase about 10% of the charge evaporates and kettle adjuncts comprising the example hops, sugar and finings are added through insert pipe 40.

During this phase the charge in the kettle is continually whirled by pumping through the boiler 6 which has a discharge into the kettle tangential to the kettle walls.

After completion of the boiling phase this boiler circuit is isolated and the charge in the kettle is allowed to spin using the inertia acquired during the boiling phase.

The mash tun spent grains are normally manually removed through the valve 26 and down the chute 30 during the boiling phase. This material can then be used for cattle feed.

When the kettle spin has been completed the clarified worts are pumped away through the in-line coolers 81 to the fermentation/maturation tanks 83, 85 etc.

On the primary wort cooler the mains cooling water is returned to the hot water tank 10 at typically 70°–80° C. so as to save energy thereby reducing the heat energy requirements for the unit.

The remaining trub charge collected in the sump 19 is discharged to drain.

After the process the mash tun and kettle are flushed clean ready for the next brew cycle.

In order to save time certain stages of the process can overlap for instance the tun can be filled during the boiling phase.

A particular advantage of the continuous kettle and boiler circulation arrangements is that the boiling process can be shortened and this results in savings in both energy and time. The combined kettle/whirlpool also saves space.

The mounting of the wort boiler in a position outside the kettle but below the kettle in the tower walls enables the boiler to be easily accessible for inspection or maintenance.

The kettle construction with a tangential input creates a whirlpool effect which rapidly stirs the boiling wort. Solids in the wort eventually fall to the trub sump for each discharge from the kettle.

What is claimed is:

1. A self-contained brewing unit comprising
   a kettle having top, bottom and circular enclosing walls,
   a mash tun mounted on the top wall of said kettle, said tun being in controlled liquid communication with said kettle,
   a hot water tank also mounted on the top wall of said kettle, said tank substantially surrounding said mash tun for establishing a heat exchange relationship between said tun and said tank during use of said unit, said tun also being in controlled liquid communication with said tank,
   a boiler mounted closely adjacent said kettle, said boiler having a boiler input and a discharge each in controlled liquid communication with said kettle, said discharge being tangential to said kettle's circular wall, said boiler input and said discharge forming a continuous liquid flow circuit between said kettle and said boiler, and
   a circulating pump for pumping liquid in said continuous liquid flow circuit.

2. A unit as claimed in claim 1 wherein tun, hot water tank, kettle and boiler are mounted in a single tower unit, the walls of the tower unit having a cylindrical outer wall.

3. A unit as claimed in claim 2 wherein said kettle's cylindrical outer wall also forms at least a part of the outer walls of the, hot water tank and mash tun, said top wall of said kettle also forming a bottom wall for said tun and said hot water tank.

4. A unit as claimed in claim 1 further comprising
   a cooling unit in controlled liquid communication with said kettle discharge, said cooling unit effecting cooling through use of a cooling water flow which circulates water through said cooling unit and then to said hot water tank, and
   at least one holding container in liquid communication with said cooling unit for holding cooled liquid discharge from said kettle during a fermentation period.

5. A unit as claimed in claim 4 further comprising
   grist feed means comprising a hopper, a mixing chamber fed by the hopper, a pump connected to the outlet of the mixing chamber, and a pump discharge feeding into the mash tun.

6. A unit as claimed in claim 4 further comprising a cleaning fluid feed means comprising a cleaning fluid tank, a connection between said tank and said circulating pump and between said pump and at least a spray head in said kettle.

7. A unit as claimed in claim 4 further comprising grist feed means having an inlet receiving grist, and an outlet,
   a vortex mixing chamber having a circular cross-section connected to said feed means outlet,
   a liquid feed connection tangential to said chamber,
   a feed pump connected to an outlet of said mixing chamber, and
   a connection between an outlet of said feed pump and said mash tun
   whereby grist may be pumped to the mash tun in a liquid suspension.

8. A unit as claimed in claim 7 wherein said connection between said feed pump and mash tun is to or near the top of said tun, and further comprising a connection between a bottom portion of said tun and said liquid feed whereby liquid in said tun may be recirculated.

9. A unit as claimed in claim 7 wherein said liquid feed is connected through a valve to said hot water tank, said mixing chamber being below said tank whereby the mixing chamber may be gravity fed with water from said tank.

10. A unit as claimed in claim 7 comprising
    a common liquid conduit is provided below said tank, said conduit being connected to said cooling unit, said boiler, a spray head in said kettle, bottom portion of said tank, bottom portion of said mash tun, and said mixing chamber, at least some of said connections being controlled by valves.

11. A unit as claimed in claim 1 wherein said mash tun has two opposed walls which converge in a direction away from an outer curved wall of said tun so that a horizontal cross-section of said tun is approximately a sector.

* * * * *